(12) United States Patent
Diamant et al.

(10) Patent No.: US 9,983,851 B1
(45) Date of Patent: May 29, 2018

(54) CHECKSUM CIRCUIT

(71) Applicant: AMAZON TECHNOLOGIES, INC., Seattle, WA (US)

(72) Inventors: Ron Diamant, Albany, CA (US); Michael Baranchik, Natanya (IL); Svetlana Kantorovych, Haifa (IL); Ori Weber, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 15/274,844

(22) Filed: Sep. 23, 2016

(51) Int. Cl.
*G06F 7/72* (2006.01)

(52) U.S. Cl.
CPC .................................. *G06F 7/727* (2013.01)

(58) Field of Classification Search
None
See application file for complete search history.

(56) References Cited

U.S. PATENT DOCUMENTS

| | | | |
|---|---|---|---|
| 5,960,012 A * | 9/1999 | Spracklen | G06F 11/10 708/490 |
| 8,856,090 B1 * | 10/2014 | Honner | G06Q 10/087 707/697 |
| 9,766,859 B2 * | 9/2017 | Cuffney | G06F 7/5016 |
| 2003/0145116 A1 * | 7/2003 | Moroney | H04L 29/06 709/249 |
| 2011/0307770 A1 * | 12/2011 | Rabinovitch | G06F 7/724 714/808 |
| 2015/0109153 A1 * | 4/2015 | Wu | H03M 7/30 341/65 |

* cited by examiner

*Primary Examiner* — David H Malzahn
(74) *Attorney, Agent, or Firm* — Blank Rome LLP

(57) ABSTRACT

A hardware circuit computes a checksum using a technique such as the Adler-32 checksum algorithm. The hardware circuit may include one or more serially-connected chains of adders followed by a modulus circuit. The modulus circuit produces a modulus value in N, where N is not an integer power of 2. In some examples, N is 65,521. In some examples, the modulus circuit may produce a modulus value modulo $2^{16}$ and then correct that value to modulo N. In other examples, the modulus circuit may include selection logic that selects an appropriate integer multiple of 65,521 to determine the modulo 65,521 result directly.

20 Claims, 5 Drawing Sheets

US 9,983,851 B1

CHECKSUM CIRCUIT

BACKGROUND

Checksum algorithms permit the detection of bit errors during transmission. A transmitter of data computes the checksum for the date and transmits the data with the checksum. The receiver of the data recomputes the checksum on the received data and compares its calculated checksum value to that provided by the transmitter. Matching checksums indicate that the data was received and decoded correctly, while mismatching checksums mean that the data was not received correctly. Suitable types of checksum algorithms include, for example, the Adler-32 and Fletcher checksum techniques. The Adler-32 checksum technique is characterized by sums that are performed modulo 65,521, which is a prime number and thus not an integer power of 2.

BRIEF DESCRIPTION OF THE DRAWINGS

For a detailed description of various examples, reference will now be made to the accompanying drawings in which.

DETAILED DESCRIPTION

Figure 1:
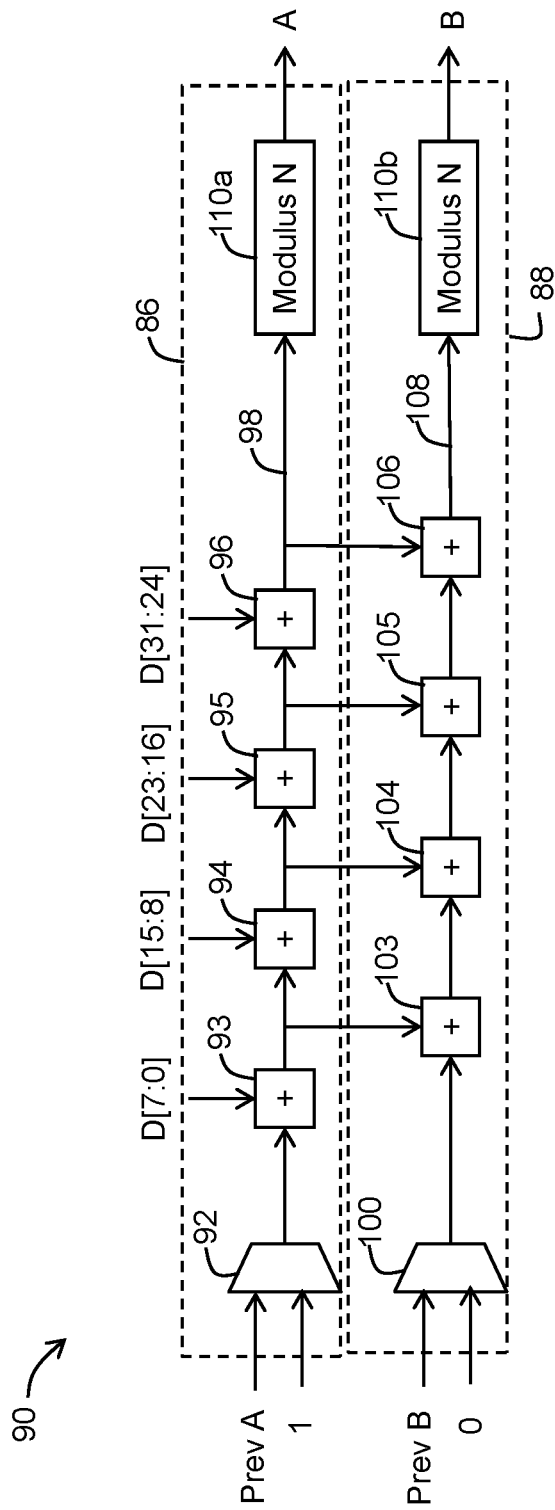
FIG. 1 shows an embodiment of a hardware checksum circuit including a modulus component in accordance with various examples.

As noted above, some checksum algorithms may use modulo N calculations in which N is not an integer power of 2. For example, in the Adler-32 algorithm, N is the value 65,521 which is the largest prime number less than $2^{16}$. Implementing power of 2 modulo in a hardware circuit or software is fairly easy, but quite difficult for non-power of 2 modulo determinations. The embodiments described herein pertain to a checksum hardware circuit and program instructions (e.g., software) that implements non-power of 2 modulo. In the described embodiments, the checksum algorithm implemented by the hardware circuit and program instructions is the Adler-32 checksum technique, but other embodiments of the hardware circuit and program instructions can implement other checksum algorithms as well, such as the Fletcher checksum algorithm. The following description pertains to a hardware circuit implementation. A software description follows the hardware circuit implementation.

The Adler-32 checksum is obtained by calculating two 16-bit checksums A and B and concatenating their bits together to form a 32-bit integer. The input data to the checksum calculation is a multi-byte input value D. The A value is the sum of all bytes in D plus 1. The B value is the sum of the individual values of A from each summing step. The sums for A and B are performed modulo 65,521.

The disclosed embodiments implement various optimizations that result in a space and speed efficient checksum determination. One of the optimizations is that the modulo determination implemented in the hardware circuit is determined after the summing operations are performed, rather than performing a modulo operation during each summing operation. The checksum circuit includes a modulus component that receives the output of a series of adders that perform the summing operations. By performing the modulo operation following the summing operations, many fewer multiplexers are needed in hardware. For example, a multiplexer is not needed in each summing operation stage of the circuit. As a result, the checksum circuit occupies less area than if each adder were implemented to perform both an add operation and a modulo operation. Further, the overall speed of the circuit is faster without the inclusion of a multiplexer at each adder stage due to the improved critical path when concatenating adders back-to-back as compared to concatenating adders through a multiplexer.

In another optimization, the modulus component generates a modulo $2^{16}$ value (65,536) instead of 65,521, and then corrects that value for the intended modulo 65,521. The values 65,536 and 65,521 are relatively close to each other—separated only by a difference of 15. As a result of determining the modulo 65,536 value initially, which is an integer power of 2, and then correcting that result, the circuit requires less hardware than a circuit that determines modulo 65,521 directly. In another embodiment, a modulus component includes selection logic that efficiently selects an appropriate integer multiple of 65,521 to determine the modulo 65,521 result.

FIG. 1 shows an example of the hardware checksum circuit 90 configured to perform the Adler-32 checksum on input data designated as D[31:0]. The checksum circuit 90 in this example includes a pair of computation paths 86 and 88. Computation path 86 includes a multiplexer 92, adders 93-96, and a modulus N component 110a that function to compute the checksum value A mentioned above. Computation path 88 includes a similar set of a multiplexer 100, adders 103-106 and a modulus N component 110b that function to compute the checksum value B. Four adders are illustrated in each computation path 86, 88, but a different number of adders (e.g., 32) can be included in other embodiments in each computation path.

Each adder 93-96 receives a byte from the input data D as shown and adds its respective byte of D to an input value. Each of the adders 94-96 generates an output value that is the sum of its respective D input and the computed sum from the previous adder. Adder 93 generates the sum of the least significant byte of D (i.e., D[7:0]) and the selected output from multiplexer 92, which may be 1 or a previously determined A checksum value (i.e., the A checksum value computed from a previous data value D[31:0] in a data stream on which the checksum is to be computed). The output from adder 93 thus is the sum of D[7:0] and either 1 or the previous A checksum value. Adder 94 then generates the sum of D[15:8] and the output from adder 93 to generate another sum output value. Similarly adder 95 generates the sum of D[23:16] and the output from adder 94 to generate its output value. Finally, adder 96 generates the sum of D[31:24] and the output from adder 95 to generate an output value. The output value form adder 96 is designated as 98 and represents the sum of all four bytes of D[31:0] plus 1 or the previous checksum A value. That is, the output value 98 is PrevA (or 1)+D[7:0]+D[15:8]+D[23:16]+D[31:24]. The output value 98 is then provided to the modulus N component 110a. For the modulus N component 110a, as is the case for the modulus N component 110b, N is 65,521 in the case of the Adler-32 algorithm.

In the computation path 88 for the checksum B value, each adder 103-106 receives the output from a corresponding adder 93-96 from the checksum value A computation path. Adder 103 generates the sum of the output of adder 93 and the selected output from multiplexer 100, which may be 0 or a previously determined B checksum value (i.e., the B checksum value computed from a previous data value D[31:0] in the data stream). Adder 104 then adds the result of adder 103 to the output of adder 94. Similarly, adder 105 adds the result of adder 104 to the output of adder 95, and adder 106 adds the result of adder 105 to the output of adder 96. The output from adder 106 is designated as 108 and thus is:

Output 108=(0 or Prev $B$)+(1+$D$[7:0])+(1+$D$[7:0]+$D$[15:8])

+(1+$D$[7:0]+$D$[15:8]+$D$[23:16])

+(1+$D$[7:0]+$D$[15:8]+$D$[23:16]+$D$[31:24])

The output value 108 is provided to the modulus N component 110b for the final determination of the checksum B value. Hardware (not shown) may concatenate the A and B checksum values together to produce a final checksum value as noted above.

In the embodiment of FIG. 1, none of the adders 93-96 and 103-106 includes modulo computation components such as multiplexers which might otherwise be usable to perform modulo computations. Instead, each modulus component 110a, 110b is coupled to the output of the corresponding serially-connected chain of adders, and thus generates modulo values after all of the summing operations have completed.

Figure 2:
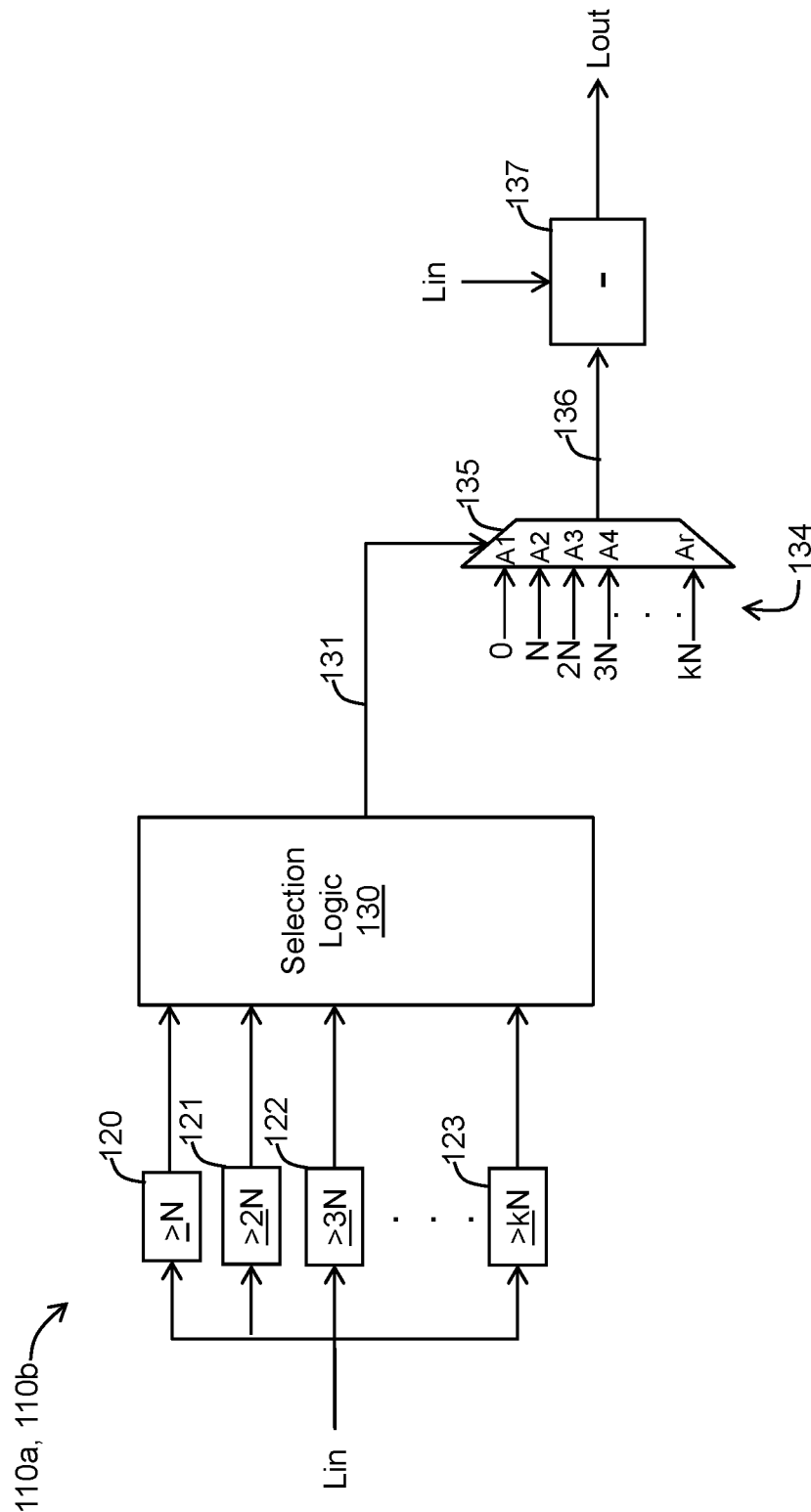
FIG. 2 shows an embodiment of the modulus component in accordance with various examples.

FIG. 2 shows an embodiment of the modulus components 110a, 110b. The same architecture may be used for both modulus components, however, the value of "k" (explained below) may be different between the modulus components 110a and 110b. The input value is designated as Lin and the output value is designated as Lout. For the computation path 86 for computing the A checksum value, Lin is the output value 98 from adder 96 and Lout is the A checksum value. For the computation path 88 for computing the B checksum value, Lin is the output value 108 from adder 106 and Lout is the B checksum value.

The modulus component in the example of FIG. 2 includes comparators 120-123, selection logic 130, multiplexer 135 and a subtractor 137. Each comparator compares Lin to an integer multiple of N, where N is 65,521. In the example shown, comparator 120 determines whether Lin is a value greater than or equal to N. Comparator 121 determines whether Lin is greater than or equal to 2N. Comparator 122 determines whether Lin is greater than or equal to 3N, and so on, with comparator 123 determining whether Lin is greater than or equal to kN, where k is chosen based on the maximum possible input value to the modulus component. The maximum possible input value to modulus component 110b is generally larger than the maximum possible input value to modulus component 110a and thus k is larger in the implementation of the modulus component 110b than modulus component 110a. In general, if the maximum possible input value is between 4*65,521 and 5*65,521, then k is selected to be 4. If Lin is indeed greater than or equal to the threshold value of a given comparator (N for comparator 120, 2N for comparator 121, etc.), the output of the comparator in some embodiments is 1 (logic high), else the output of the comparator is a 0 (logic low). The comparators' output signals can be generated with the opposite polarity as well. By examination of the comparators' output signal levels, the range of Lin can be determined. For example, if Lin is a value between two and three times N, then the output signal levels from comparators 120 and 121 will be a logic 1, and the output signal level of all other comparators including comparator 122 will be a logic 0. As such, the value of Lin is known to be between 2N and 3N as the output logic levels of the comparators changes from the 2N comparator 121 and the 3N comparator 122.

The selection logic 130 may be implemented as a plurality of combinatorial logic gates that generate an output control signal 131 based on the outputs of the various comparators 120-123. The output control signal 131 is a control signal for multiplexer 135 and causes the multiplexer to select a particular one of its inputs 134 as its output signal 136. The inputs 134 include the various integer multiples of N implemented in the comparators 120-123 as well as the value 0. The output control signal 131 may comprise a plurality of signals that collectively cause a particular input 134 to be selected. In some embodiments, each control signal may be generated as a Boolean function implemented by one or more logic gates within the selection logic. In one such example, the Boolean function to generate a control signal K (for K=1 to k-1) is a logical AND operation between the output signal from comparator K and an inverted version of the output signal from comparator K-1. The multiplexer inputs are designated as A1, A2, A3, A4, . . . , Ar. A logic low is provided to the A1 input. The value of N is provided to the A2 input. The values of 2N, 3N, . . . , kN are provided to the remaining inputs A3, A4, . . . , Ar as shown. If Lin is less than N, then all of the comparators 120-123 may generate logic lows on their outputs and the control signal 131 generated by the selection logic 130 will be a value that selects the A1 input corresponding to 0. If Lin is between N and 2N, then the control signal is generated to select the A2 input corresponding to N. The value of the control signal 131 causes the multiplexer 135 to select as its output the largest integer multiple of N (or 0 if Lin is less N) that is less than Lin. That value is generated by the multiplexer as its output signal and is subtracted from Lin by subtractor 137 (e.g., a subtraction circuit) to produce the Lout output value. The value of Lout thus represents the Lin modulo 65,521.

Figure 3:
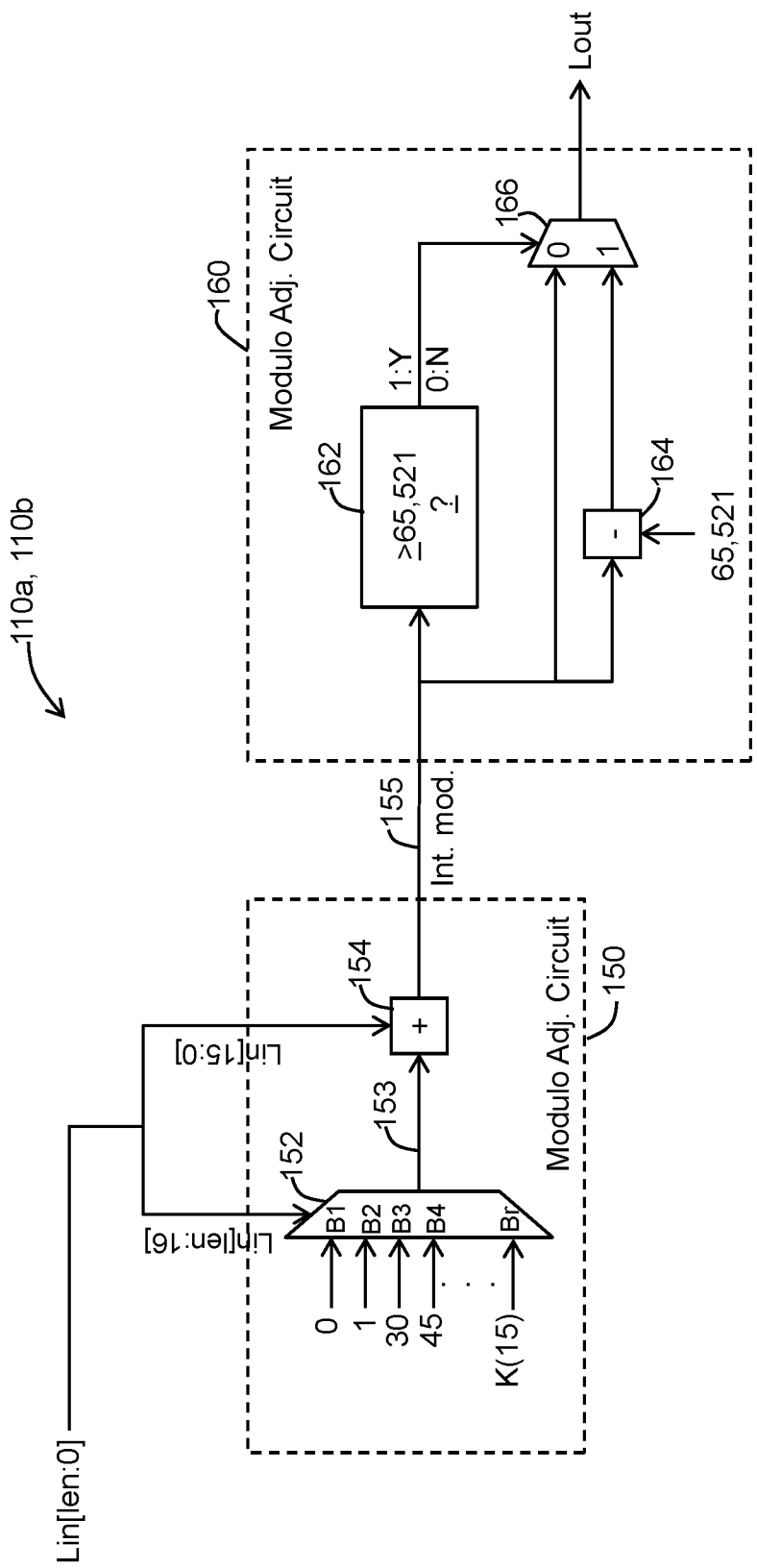
FIG. 3 shows another embodiment of the modulus component in accordance with various examples.

FIG. 3 illustrates another embodiment of the modulus components 110a, 110b. In this example, each modulus component produces a modulo $2^{16}$ (65,536) value and then corrects that result with multiple modulo adjustment circuits—modulo adjustment circuit 150 and modulo adjustment circuit 160. Modulo adjustment circuit 150 includes a multiplexer 152 and an adder 154. Modulo adjust circuit 160 includes a comparator 162, a subtractor 165, and a multiplexer 166.

The input value Lin is a multi-bit value having bits ranging from a least significant bit 0 to a most significant bit designated as "len." Thus, Lin is represented in FIG. 3 as Lin[len:0]. The least significant 16 bits, that is Lin[15:0], represent Lin modulo 65,536, and are provided as an input to the adder 154. The inputs to the multiplexer 152 are 0 as well as various integer multiples of 15 (15, 30, 45, . . . , k(15)), where k is determined as explained above. The multiplexer 152 inputs are designated as B1, B2, B3 . . . , Br. The B1 input is preconfigured as a 0. The B2 input is 15. The B3 input is 30, and so on. The number 15 is the difference between the desired modulo 65,521 and the modulo (65,536) determined from the selection of the lower order 16 bits of Lin. Because modulo 65,536 is initially determined in the embodiment of FIG. 3, the resulting value is then corrected for the desired modulo 65,521. The modulo adjustment circuit 150 adds a particular integer multiple of 15 (or 0) to Lin[15:0]. The particular integer multiple of 15 is determined by the upper order bits of Lin, that is Lin[len:16], which are used as the selection control signal to the multiplexer 152. Bits Lin[len;16] represent the division result modulo 65,536. If, for example, bits Lin[len:16] have the value ooh, then the B1 input (0) is selected as the multiplexer's output 153 to the adder 154. By way of another example, if Lin[len:16] is 01 h, then the B2 input (15) is selected as the multiplexer's output 153 to the adder 154. Thus, the value added to Lin[15:0] is an integer multiple of 15, where the integer is the value of Lin[len:16]. The resulting summed output from adder 154 is the modulo 65,536 corrected to modulo 65,521, and is designated in FIG. 3 as the intermediate modulo value 155.

The modulo adjustment circuit 160 makes one additional correction to the intermediate modulo value 155 from modulo adjustment circuit 150 for the boundary case in which the intermediate modulo value 155 is a value that is greater than or equal to 65,521. In that case, 65,521 is subtracted out from the intermediate modulo value 155 to produce the final output modulo value Lout. Comparator 162 compares the intermediate modulo value 155 to a reference value 65,521 and, in the embodiment of FIG. 3, generates a logic high (1) if the intermediate modulo value 155 is greater than or equal to 65,521, or a logic low (0) if the intermediate modulo value 155 is less than 65,521. The output signal from the comparator 162 is used as a selection control signal to multiplexer 166. A logic high (1) output from the multiplexer 162 selects the output from the subtractor 164 (e.g., a subtraction circuit) to be Lout, whereas a logic low (0) selects the intermediate modulo value 155 to be Lout.

Figure 4:
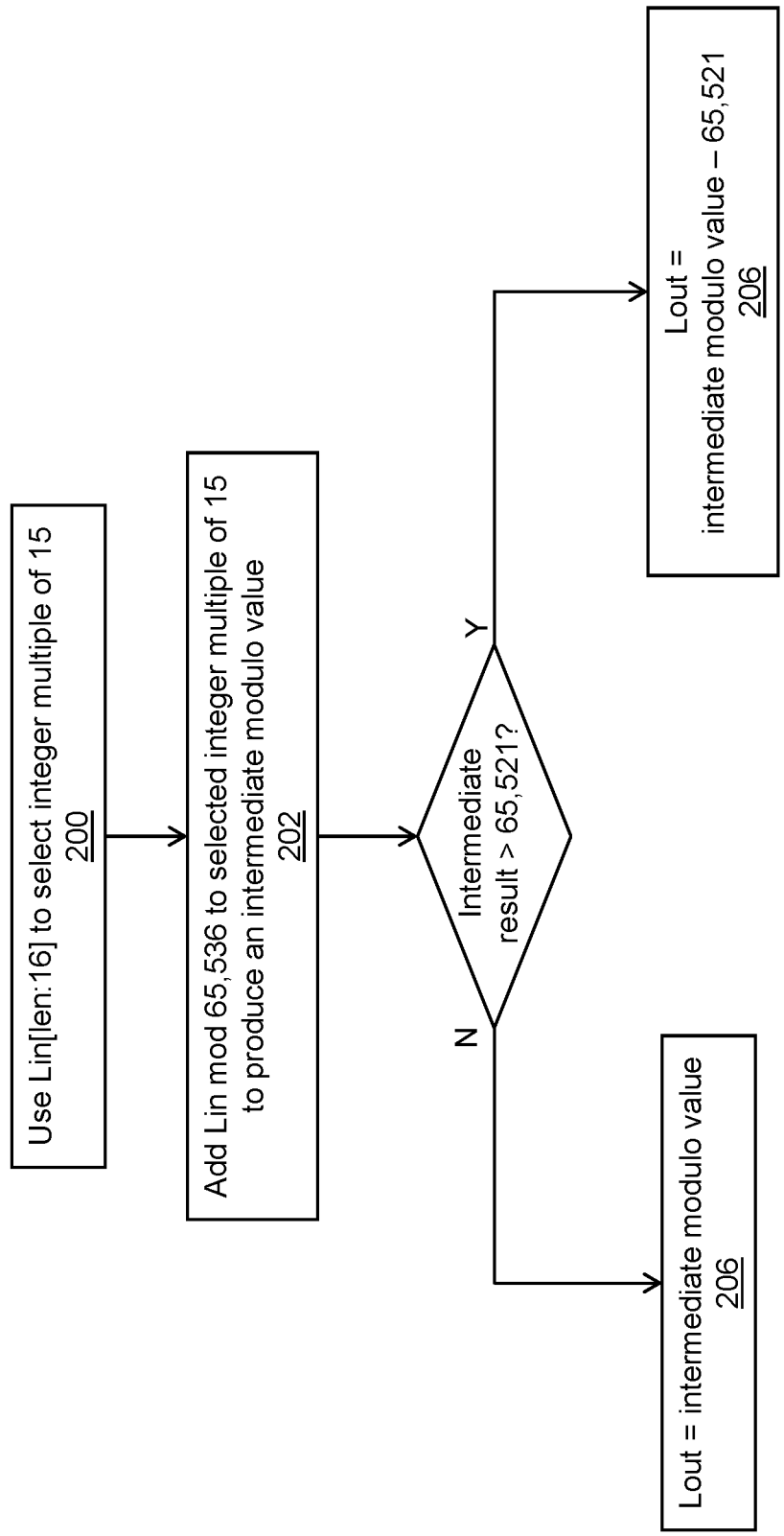
FIG. 4 is a flow chart illustrating a method in accordance with various examples.

FIG. 4 is an example of a method in accordance with the embodiment of FIG. 3. At 200, the method includes using Lin[len:16] to select an integer multiple of 15. Of course, the value of 15 is specific to the embodiment in which the desired modulo value is different from the determined modulo value by a difference of 15. A value other than 15 may be implemented for the inputs to the multiplexer 152 in FIG. 3.

At 202, the method includes adding two values together. One value is Lin modulo 65,536, (which is the bits Lin[15:0]) and the other value is the selected integer multiple of 15. The resulting sum is the intermediate modulo value 155 and, at 204, is compared to 65,521. If the intermediate modulo value 155 is greater than or equal to 65,521, Lout is generated as the intermediate modulo value 155 minus 65,521. This operation may be implemented by the subtractor 164 and the multiplexer 166, based on a logic high signal level from comparator 162, selecting the subtractor's output as Lout. If the intermediate modulo value is less than 65,521, Lout is generated as the intermediate modulo value itself as described above.

Figure 5:
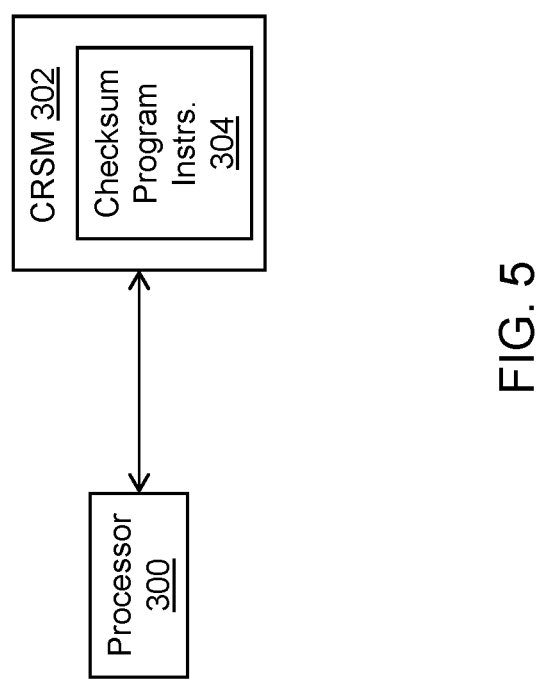
FIG. 5 shows an embodiment of computer-readable medium containing program instructions in accordance with various examples.

As noted above, the principles discussed herein can be implemented in program instructions as well. FIG. 5 illustrates an embodiment in which a processor 300 (e.g., a central processing unit) is coupled to a non-transitory storage medium (CRSM) 302 such as volatile storage (e.g., random access memory) or non-volatile storage (e.g., a magnetic storage drive, a solid state storage drive, etc.). The CRSM 302 stores checksum program instructions 304. When executed, the checksum program instructions 304 cause the processor 300 to perform some or all of the operations described herein. The checksum program instructions 304 may include multiple instructions that collectively perform the various operations described above. In one example, an instruction may be available in a form such as MOD=A % 65,521, where the percent sign designates the modulo operation. When this program instruction is compiled, the compiler may implement the modulo operation as described above through execution of the checksum program instructions 304. For example, a series of add instructions may be executed by the processor executing the program instructions followed by instructions that implement the modulus logic of, for example, FIG. 2 or 3.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A checksum circuit, comprising:
   a plurality of series-coupled adders;
   a modulus N circuit coupled to a last adder in the series-coupled plurality of adders, where N is not an integer power of 2, wherein the modulus N circuit is configured to receive an Lin[len:0] value from the last adder, where len is the most significant bit of Lin and wherein the modulus circuit includes:
   a first multiplexer that includes a plurality of inputs configured to collectively provide a plurality of input values that include integer multiples of 15, wherein bits Lin[len:16] are configured to select one of the first multiplexer's inputs to provide an output value from the first multiplexer; and
   an adder coupled to the multiplexer and configured to add bits Lin[15:0] to the first multiplexer's output value to produce an intermediate modulo value.

2. The checksum circuit of claim 1, further comprising an adjustment circuit coupled to the adder, wherein the adjustment circuit is configured to correct the intermediate modulo value from the adder when the adder's output value is greater than or equal to N.

3. The checksum circuit of claim 2, wherein the adjustment circuit comprises:
   a comparator configured to generate an output control signal based on a comparison of the adder's output value to 65,521;
   a subtractor to compute a difference value between the adder's output value and 65,521; and
   a second multiplexer coupled to the comparator and the subtractor and configured to generate a final modulo N value using the control signal from the comparator to select the output value from the comparator or the difference value from the subtractor.

4. The checksum circuit of claim 1, wherein N is 65,521.

5. A checksum circuit, comprising:
   a first computation path comprising a first multiplexer, a first serially-coupled chain of adders, and a first modulus N circuit coupled to a last adder of the first serially-coupled chain, wherein the first modulus N circuit is configured to compute a modulo N value from an output of the last adder of the first serially-coupled chain of adders, and wherein N is not an integer power of 2 and wherein the output of the last adder of the first serially-coupled chain of adders is a value in a range from 0 to an integer multiple of N;
   a second computation path comprising a second multiplexer, a second serially-coupled chain of adders, and a second modulus N circuit coupled to a last adder of the second serially-coupled chain, wherein the second modulus N circuit is configured to compute a modulo N value from an output of the last adder of the second serially-coupled chain of adders, and wherein the output of the last adder of the second serially-coupled chain of adders is a value in a range from 0 to an integer multiple of N;

wherein, for each adder in the first serially-coupled chain of adders, an adder output value is provided as an input to an adder in the second serially-coupled chain of adders.

6. The checksum circuit of claim 5, wherein each of the first and second modulus N circuits comprises:
   a plurality of comparators, each comparator configured to compare a value from the last adder to which the respective modulus N circuit is coupled to a different integer multiple of N;
   selection logic coupled to the comparators and configured to generate a control signal that encodes the largest number of integer multiples of N that is less than or equal to the value from the last adder to which the respective modulus N circuit is coupled;
   a third multiplexer configured to receive as inputs a value of 0 and a plurality of integer multiples of N and to generate an output value using the control signal from the selection logic; and
   a subtractor configured to subtract the output value from the third multiplexer from the value from the last adder to which the respective modulus N circuit is coupled.

7. The checksum circuit of claim 5, wherein each of the first and second modulus N circuits comprises:
   a first modulo adjustment circuit configured to generate a modulo $2^{16}$ value and at least partially correct the modulo $2^{16}$ value for modulo N to produce an intermediate modulo value; and
   a second modulo adjustment circuit coupled to the first modulo adjustment circuit and configured to adjust the intermediate modulo value when the intermediate modulo value is greater than N.

8. The checksum circuit of claim 7, wherein each of the first modulo adjustment circuits is configured to receive an input value Lin[len:0] where len is the most significant bit of Lin, and each of the first modulo adjustment circuits comprises:
   a third multiplexer that includes a plurality of inputs configured to collectively provide a plurality of input values that include integer multiples of 15, wherein bits Lin[len:16] are configured to select one of the third multiplexer's inputs to provide an output value from the third multiplexer; and
   an adder coupled to the third multiplexer and configured to add bits Lin[15:0] to the third multiplexer's output value to produce the intermediate modulo value.

9. The checksum circuit of claim 8, wherein each of the second modulo adjustment circuits comprises:
   a comparator configured to generate an output control signal based on a comparison of the intermediate modulo value to 65,521;
   a subtractor to compute a difference value between the intermediate modulo value and 65,521; and
   a fourth multiplexer coupled to the comparator and the subtractor and configured to generate a final modulo N value using the control signal from the comparator to select the output value from the comparator or the difference value from the subtractor.

10. The checksum circuit of claim 7, wherein each of the second modulo adjustment circuits includes a comparator configured to generate an output control signal based on a comparison of the intermediate modulo value to 65,521.

11. The checksum circuit of claim 10, wherein each of the second modulo adjustment circuits also includes:
   a subtractor to compute a difference value between the intermediate modulo value and 65,521; and
   a third multiplexer coupled to the comparator and the subtractor and configured to generate a final modulo N value using the control signal from the comparator to select the output value from the comparator or the difference value from the subtractor.

12. The checksum circuit of claim 11, wherein the control signal causes the third multiplexer to generate the final modulo N value to be:
   the intermediate value when the intermediate value is greater than or equal to 65,521; and
   the difference value when the intermediate value is less than 65,521.

13. The checksum circuit of claim 5, wherein the checksum circuit generates an Adler-32 checksum value and N is 65,521.

14. A method, comprising:
   producing a first modulus value in an integer power of 2 from a set of lower order bits of an input value;
   selecting, by a first multiplexer, an integer multiple of X using a set of higher order bits of the input value as a control signal to the first multiplexer, where X is a difference between the integer power of 2 and a value that is not an integer power of 2;
   adding, by an adder, the first modulus value to the selected integer multiple of X to produce an intermediate modulo value; and
   adjusting, by an adjustment circuit, the intermediate modulo value to produce a modulo value in the value that is not an integer power of 2.

15. The method of claim 14, wherein adjusting the intermediate modulo value comprises subtracting, by a subtraction circuit, the value that is not an integer power of 2 from the intermediate modulo value.

16. The method of claim 14, wherein adjusting the intermediate modulo value comprises asserting a control signal to a multiplexer to generate an output equal to the intermediate modulo value.

17. The method of claim 14, wherein the value that is not an integer power of 2 is 65,521 and the integer power of 2 is $2^{16}$.

18. The method of claim 14, wherein the lower order bits of the input value are the lower order 16 bits of the input value.

19. The method of claim 14, further comprising generating the input value by a serially-connected chain of adders.

20. A non-transitory computer-readable medium storing program instructions which, when executed by a processor, causes the processor to:
   produce a first modulus value in an integer power of 2 from a set of lower order bits of an input value;
   select, by a first multiplexer, an integer multiple of X using a set of higher order bits of the input value as a control signal to the first multiplexer, where X is a difference between the integer power of 2 and a value that is not an integer power of 2;
   add, by an adder, the first modulus value to the selected integer multiple of X to produce an intermediate modulo value; and
   adjust, by an adjustment circuit, the intermediate modulo value to produce a modulo value in the value that is not an integer power of 2.

* * * * *